(12) United States Patent
Coventry et al.

(10) Patent No.: US 8,118,215 B2
(45) Date of Patent: Feb. 21, 2012

(54) SELF-SERVICE TERMINAL (75) Inventors: Lynne M. Coventry, Edinburgh (GB); Philip N. Day, Fife (GB); Avril M. Kidd, Dundee (GB)

(73) Assignee: NCR Corporation, Duluth, GA (US)

( * ) Notice: Subject to any disclaimer, the term of this patent is extended or adjusted under 35 U.S.C. 154(b) by 665 days.

(21) Appl. No.: 11/904,091

(22) Filed: Sep. 26, 2007

(65) Prior Publication Data
US 2009/0083182 A1    Mar. 26, 2009

(51) Int. Cl.
*G07F 19/00* (2006.01)
(52) U.S. Cl. ...................................................... 235/379
(58) Field of Classification Search .................. 235/379, 235/380; 902/8–10; 705/43
See application file for complete search history.

(56) References Cited

U.S. PATENT DOCUMENTS

| 5,253,167 | A  | * | 10/1993 | Yoshida et al. | 705/43 |
| 6,073,172 | A  | * | 6/2000  | Frailong et al. | 709/222 |
| 6,109,522 | A  | * | 8/2000  | Force et al. | 235/379 |
| 7,077,312 | B2 | * | 7/2006  | Putman et al. | 235/379 |
| 7,419,090 | B2 | * | 9/2008  | Sawa | 235/379 |

* cited by examiner

*Primary Examiner* — Seung Lee
(74) *Attorney, Agent, or Firm* — Paul W. Martin

(57) ABSTRACT

A method of operating a self-service terminal and a network of self-service terminals. The method comprises: receiving notification that a maintenance operation has been performed on the terminal; performing a compliance check on the terminal; and issuing a code in the event that the compliance check is successful. The code can be used to audit and/or validate that the maintenance operation was performed successfully and that the terminal was left in working order.

14 Claims, 4 Drawing Sheets

SELF-SERVICE TERMINAL

BACKGROUND OF THE INVENTION

The present invention relates to a self-service terminal (SST).

SSTs are public access devices that are suitable for allowing a user to conduct a transaction or to access information in an unassisted manner and/or in an unattended environment. An SST deployer may decide to provide human assistance and/or supervision for users of the SST; however, SSTs are typically designed so that such assistance and/or supervision is not essential.

Common examples of SSTs include automated teller machines (ATMs), information kiosks, financial services centers, bill payment kiosks, lottery kiosks, postal services machines, check-in and check-out terminals such as those used in the hotel, car rental, and airline industries, retail self-checkout terminals, vending machines, and the like.

Many types of SSTs, such as ATMs and postal services machines, have a number of peripherals that interact to provide a transaction or service, and that dispense media (such as banknotes and receipts) to a user. It is important to replenish this media regularly and also to ensure that the SST is serviced correctly to ensure that the SST remains fully functional and operational.

One problem with replenishing and servicing SSTs is that sometimes an SST is inadvertently left in a non-working state by service or replenishment personnel after a replenishment or servicing operation is finished. This is particularly common for replenishment operations because a replenisher may not look at an operator panel in the SST that typically displays fault information.

SUMMARY

According to a first aspect of the present invention there is provided a method of operating a self-service terminal, the method comprising: receiving notification that a maintenance operation has been performed on the terminal; performing a compliance check on the terminal; and issuing a code in the event that the compliance check is successful.

The step of receiving notification that a maintenance operation has been performed may be implemented by (i) receiving a command entered by an operator, (ii) detecting a state of one or more sensors within the self-service terminal (such as micro-switches indicating whether a device is fully inserted or partially removed), (iii) detecting if the terminal receives a request to change from maintenance mode to transaction mode, or (iv) any other convenient way.

As used herein, a maintenance operation comprises a task or a series of tasks to maintain a self-service terminal in, or to return a self-service terminal to, full normal operation. A maintenance operation includes servicing the self-service terminal or a part thereof (such as a device installed in the self-service terminal), replenishing media within the self-service terminal (such as banknotes or receipt paper), or removing media from a self-service terminal (such as deposited checks or banknotes), or the like.

The method may comprise the further step of the terminal communicating the issued code to a remote management system. The remote management system may perform centralized maintenance dispatch and management functions.

The method may comprise the further step of entering a maintenance mode prior to receiving notification that a maintenance operation has been performed. An operator switch may be provided to allow the operator to change the self-service terminal from transaction mode to maintenance mode, and back again to transaction mode. When in maintenance mode, the terminal may not allow any customers to conduct transactions at the terminal. Alternatively, a limited transaction set may be available, depending on the devices being operated on.

The method may comprise the further step of providing status information to an operator prior to receiving notification that a maintenance operation has been performed.

The compliance check may comprise communicating with devices in the self-service terminal to receive status information. The compliance check may comprise exercising devices in the self-service terminal and receiving information relating to the devices in response to the exercising step.

The step of issuing a code may comprise generating a code. The code may be generated based on the particular operations performed (such as the devices that were operated on), the identity of the operator, the sequence of steps performed during an operation, the time at which the operations were performed, a combination of the preceding, or such like. Generating the code based on the devices that were operated on allows auditing and/or validating of the tasks performed by an operator by analyzing the code issued by the self-service terminal.

Alternatively, the step of issuing a code may comprise providing a code received from another terminal, such as a management system. This would allow a single centralized management system to control generation of codes for a whole network of self-service terminals.

The step of issuing a code may include presenting the code on a display in the self-service terminal, printing the code, and/or electronically transmitting the code to a portable device carried by the operator. The self-service terminal may include a transaction display, which would be viewed by a customer, and a maintenance display (such as a rear operator panel), which would be viewed by an operator performing a maintenance operation.

By presenting the code on a display that also presents any fault information, a maintenance person will be much more likely to notice any faults presented on the display, and rectify these faults before leaving the terminal.

The issued code may be used as an access code to enable an operator to perform a maintenance operation at another self-service terminal, for example, the next self-service terminal that the operator is scheduled to visit. The self-service terminal may communicate this code to a remote management system that transmits the code to the next self-service terminal on the operator's route. Alternatively, the management system may use the code received from a self-service terminal and compare this code with a code received subsequently from another self-service terminal (which code was entered by the operator prior to performing a maintenance operation) to authorize access to that terminal by the operator. This would ensure that an operator has to receive a correct code to allow him/her to operate on the next self-service terminal. Thus, a code issued for successful completion of one operation on a self-service terminal becomes the code used to allow the operator to perform a maintenance operation on another self-service terminal.

According to a second aspect of the present invention there is provided a method of operating a self-service terminal, the method comprising: changing operation of the terminal from transaction mode in which a terminal customer can perform a transaction to maintenance mode in which a terminal operator can perform a maintenance function; providing status information to an operator; receiving notification that a maintenance operation has been completed; performing a compliance check prior to returning the terminal to transaction mode; and issuing a code in the event of a successful compliance check.

According to a third aspect of the present invention there is provided a self-service terminal comprising: a plurality of customer interaction devices; and a controller coupled to the customer interaction devices for controlling their operation, the controller being operable in a maintenance mode in which an operator can perform a maintenance function on the terminal, and a transaction mode in which a customer can perform a transaction at the terminal, the controller being programmed: (i) to communicate with the customer interaction devices and a remote management system; (ii) to detect a request to change from maintenance mode to transaction mode; (iii) to perform a compliance check in response to detecting the request to change from maintenance mode to transaction mode; and (iv) to issue a code in the event of a successful compliance check.

The self-service terminal may be an automated teller machine (ATM), information kiosk, financial services centre, bill payment kiosk, lottery kiosk, postal services machine, check-in and check-out terminal such as those used in the hotel, car rental, and airline industries, or a retail self-check-out terminal.

The customer interaction devices may be selected from the group comprising: a card reader, a display, an encrypting keypad, a receipt printer, a statement printer, a dispenser, a check processing module, a cash recycler, a depository, or the like.

According to a fourth aspect of the present invention there is provided a method of operating a self-service terminal in a network of self-service terminals coupled to a management system, the method comprising: performing a compliance check subsequent to performance of a maintenance operation; issuing a code to an operator in the event that the compliance check is successful; and transmitting the issued code to the management system.

The method may comprise the further steps of: receiving the issued code from the operator, comparing the received issued code with the transmitted issued code, and accrediting the maintenance operation in the event of a match.

By virtue of this aspect of the invention, an operator may only be accredited for a maintenance operation he/she has performed if the operator has received a correct code from the terminal on which the maintenance operation was performed. This enables a maintenance company to validate that an operator left a self-service terminal in working order because a correct code is only issued in the event that the self-service terminal is in a correct state when switched to transaction mode.

According to a fifth aspect of the present invention there is provided a method of operating a network of self-service terminals coupled to a management system, the method comprising: receiving from a self-service terminal a completion code issued by that self-service terminal in response to a maintenance operation performed by a maintenance person, receiving from the maintenance person a completion code purportedly issued by the self-service terminal; and validating the maintenance operation in the event of a match According to a sixth aspect of the present invention there is provided a method of operating a self-service terminal, the method comprising: issuing a code to an operator in the event that the operator attempts to leave the self-service terminal in a correct operating state.

As used herein, a customer refers to a person using a self-service terminal to conduct a transaction or receive information; whereas, an operator refers to a person authorized to open up and maintain a self-service terminal.

BRIEF DESCRIPTION OF THE DRAWINGS

These and other aspects of the present invention will be apparent from the following specific description, given by way of example, with reference to the accompanying drawings, in which.

DETAILED DESCRIPTION

Figure 1:
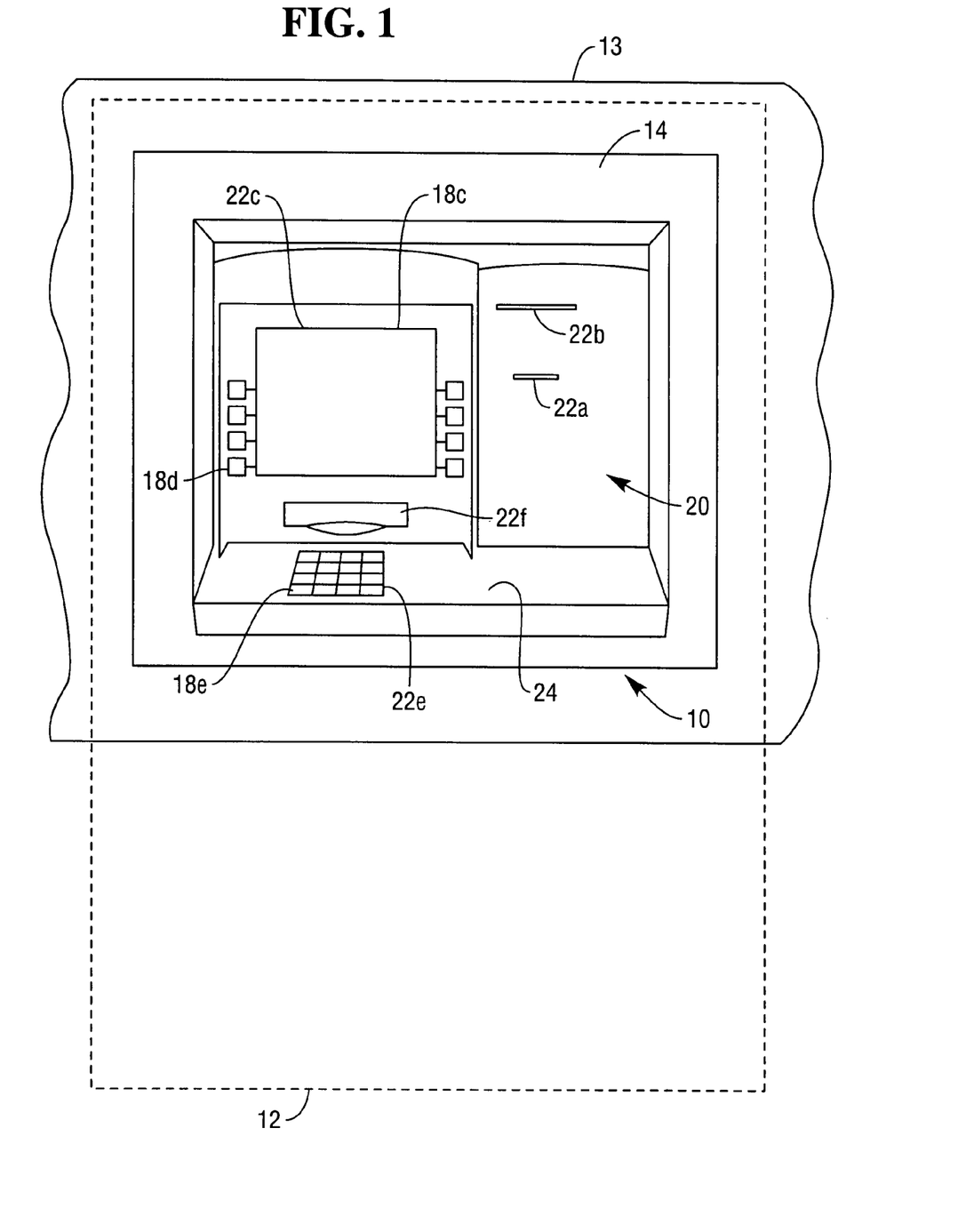
FIG. 1 is a pictorial front view of a self-service terminal (in the form of an ATM) according to one embodiment of the present invention.
Figure 2:
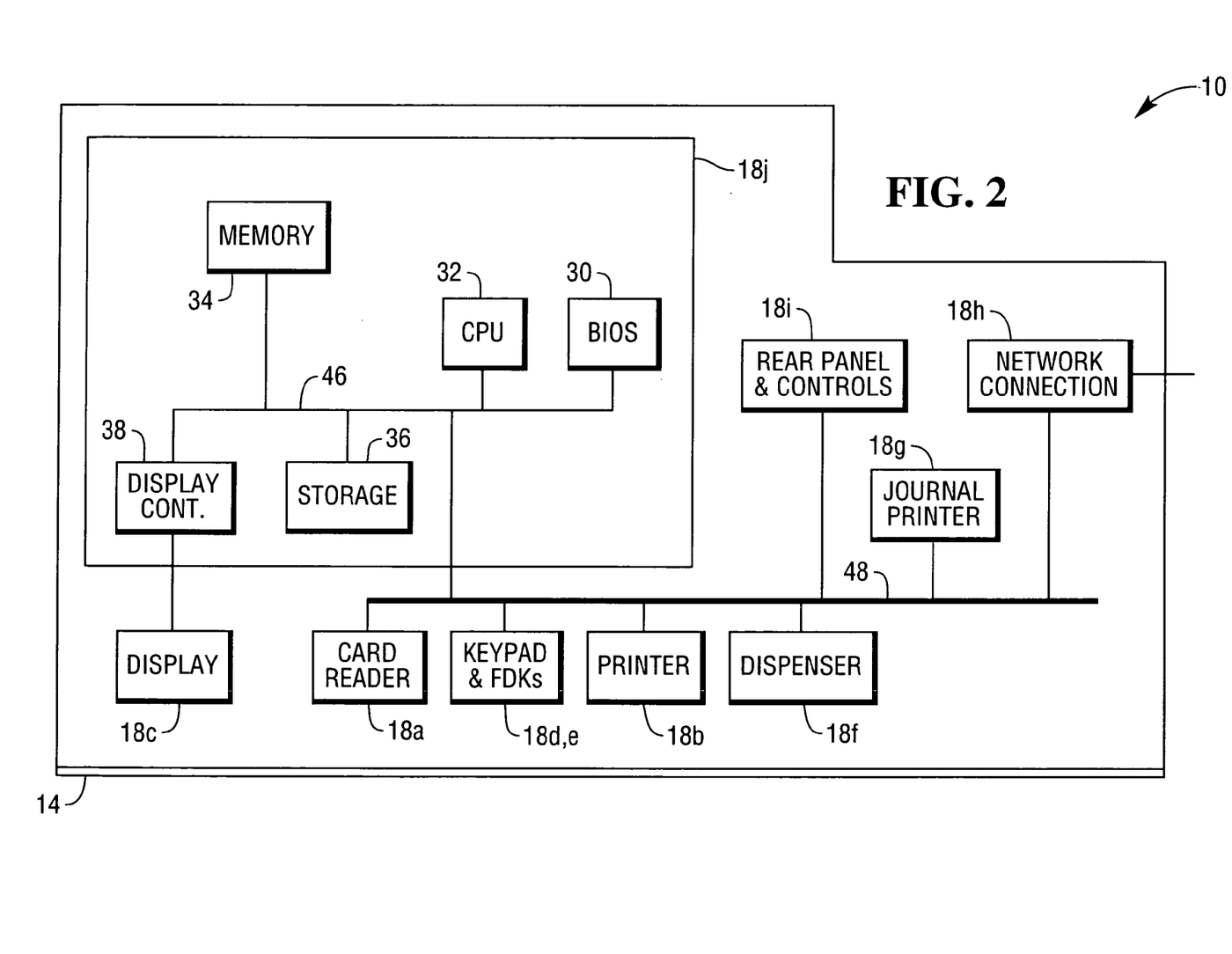
FIG. 2 is a block diagram showing the ATM of FIG. 1 in more detail.

Reference is first made to FIG. 1, which is a pictorial front view of a self-service terminal 10, in the form of a through-the-wall (TTW) ATM, according to one embodiment of the invention. Reference is also made to FIG. 2, which is a schematic diagram illustrating the ATM 10 of FIG. 1 and showing internal devices mounted within the ATM 10.

The ATM 10 has a chassis 12 (shown in dotted line) protruding in part through an aperture in a wall 13, and on which is mounted a plastic fascia 14. The ATM 10 is a rear access ATM having an access door (not shown) hingably coupled to the rear of the chassis 12. When the door (not shown) is swung open, an operator can gain access to devices 18 (best seen in FIG. 2) located within the ATM 10.

The fascia 14 provides part of a user interface 20 to allow a customer to interact with the ATM 10. In particular, the fascia 14 has apertures 22 aligning with devices 18 when the fascia 14 is pivoted to the closed position.

The fascia 14 defines: a card reader slot 22a aligning with a card reader device 18a; a receipt printer slot 22b aligning with a receipt printer device 18b; a display aperture 22c aligning with a display 18c and associated function display keys (FDKs) 18d disposed as two columns, each on opposing sides of the display 18c; a keypad aperture 22e through which an encrypting keypad device 18e protrudes; and a dispenser slot 22f aligning with a dispenser device 18f.

With the exception of the encrypting keypad 18e, the devices 18 are all mounted within the chassis 12. The encrypting keypad 18e is mounted on a shelf portion 24 of the fascia 14, which extends outwardly from beneath the display aperture 22c.

Referring now to FIG. 2, the ATM 10 also includes the following internal devices 18 that are not directly viewed or accessed by a customer during the course of a transaction. These devices 18 include: a journal printer device 18g for creating a record of every transaction executed by the ATM 10, a network connection device 18h for accessing a remote authorization system (not shown), a rear operator panel (including control switches in the form of small FDKs) 18i, and a controller device 18j (in the form of a PC core) for controlling the operation of the ATM 10, including the operation of the other devices 18. These devices 18g,h,i,j are all mounted within the chassis 12 of the ATM 10.

The controller 18j comprises a BIOS 30 stored in non-volatile memory, a microprocessor 32, associated main memory 34, storage space 36 in the form of a magnetic disk drive, and a display controller 38 in the form of a graphics card.

The display 18c is connected to the microprocessor 32 via a graphics card 38 installed in the controller 18j and one or more internal controller buses 46. The other ATM devices (18a, b, and 18d to 18i) are connected to the ATM controller 18j via a device bus 48 and the one or more internal controller buses 46.

Initialization of the ATM

When the ATM 10 is booted up, the microprocessor 32 accesses the magnetic disk drive 36 and loads the main memory 34 with software components, as will be described with reference to FIG. 3, which is a schematic diagram illustrating how software components interact in main memory 34.

Operating System

The microprocessor 32 loads an operating system kernel 60 into the main memory 34. In this embodiment, the operating system is a Windows XP (trade mark) operating system, available from Microsoft Corporation. The operating system includes a plurality of device drivers 62a,b, . . . for interfacing with standard computing devices such as the magnetic disk drive 36, the display 18c, USB ports, and such like.

Run-time Platform

The microprocessor 32 also loads a run-time platform 70 into the main memory 34. In this embodiment, the runtime platform 70 is a set of APTRA (trade mark) XFS components, available from NCR Corporation, 1700 S. Patterson Blvd., Dayton, Ohio 45479, U.S.A. The run-time platform 70 provides a range of programming facilities specific to self-service terminal devices and services.

One function of the run-time platform 70 is to enhance the operating system 60 so that the operating system and run-time platform 70 together provide high level access to all of the devices 18, including both standard computing devices (via the operating system 60), and non-standard computing devices (via the run-time platform 70). Thus, the combination of the run-time platform 70 and the operating system 60 can be viewed as providing a complete ATM operating system.

The platform 70 comprises a plurality of self-service device drivers 72a,b, . . . that interface with self-service specific devices. Although only three device drivers 72 are shown, there are many device drivers in the platform 70, one for each self-service specific device, such as the card reader 18a, the receipt printer 18b, the FDKs 18d, the encrypting keypad 18e, and the cash dispenser 18f. Furthermore, there are many more devices 18 in an ATM than those described herein. These devices are not discussed herein because they are not essential to an understanding of the invention.

The platform 70 also includes support files (not shown) for use with the self-service drivers 72 to allow each device 18 to operate. For each self-service device 18, the driver 72 and any associated support files enable that device 18 to be operated, tested, maintained, and configured. The platform 70 also includes drivers to facilitate encrypted communication between the devices 18, for example, between the card reader 18a and the controller 18j, between the printer 18b and the controller 18j, and such like.

If a new device is to be added to the ATM 10, then a corresponding driver and any associated support files are also added. Thus, the platform 70 provides the environment needed for the ATM's self-service devices to be operated and maintained.

Control Application

The microprocessor 32 also loads a control application (CA) 80 into the main memory 34. The CA 80 provides transaction processing functions (for customers and for maintenance personnel) and device management functions.

Figure 3:
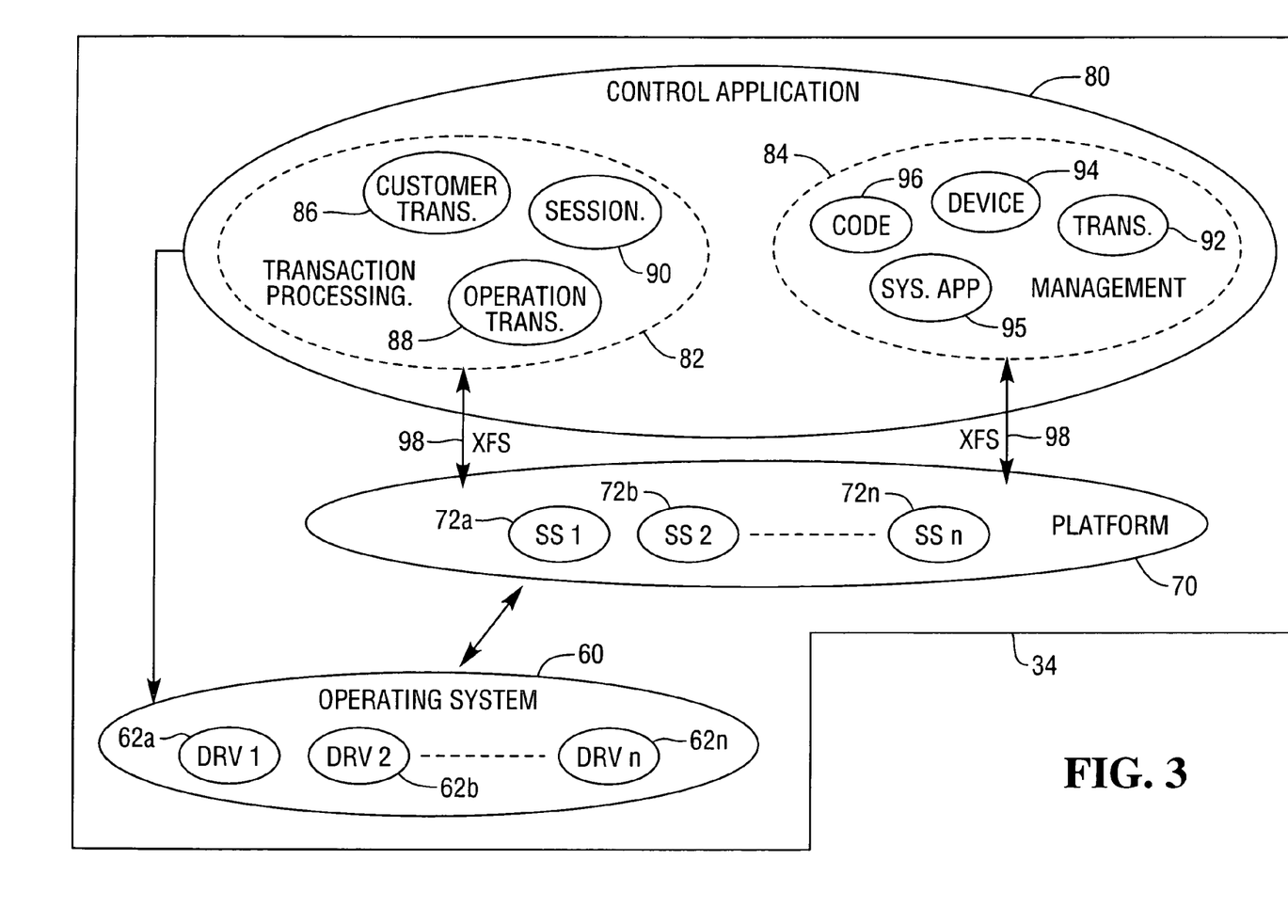
FIG. 3 is a schematic diagram illustrating software components executing in a part (the controller) of the ATM of FIGS. 1 and 2.

For clarity, and to aid understanding, the control application 80 is represented in FIG. 3 as comprising two logical parts: a transaction processing part 82 for implementing transaction processing functions, and a management part 84 for implementing device management functions. Each of these parts comprises a plurality of objects, each object performing a predetermined function. However, it should be appreciated that the particular structure used to implement these functions is a matter of design choice, for example, the control application 80 may be implemented as a single monolithic program, or as a set of discrete objects that can interact with one another.

The transaction processing part 82 includes a customer transaction processing object 86, an operation transaction processing object 88, and a session manager object 90.

The management part 84 includes a transaction management object 92, a device management object 94, a system application object 95, and a code issuing object 96.

In this embodiment, objects in the transaction processing part 82 interact with objects in the management part 84 either directly via an object interface (not shown), or indirectly via an open interface 98 to the platform 70.

The open interface 98 is a standard interface for making use of self-service devices 18 (referred to herein as a CEN XFS API). This CEN XFS interface is used to instruct the devices 18 to perform operations, and is also used to obtain device status and fault management information.

The customer transaction object 86 provides processing logic and presentation information to allow a customer to execute a transaction at the ATM 10. The customer transaction object 86 controls the presentation of screens to an ATM customer to guide a customer through a transaction.

The term "screen" is used herein to denote the graphics, text, controls (such as menu options), and such like, that are presented on an SST display; the term "screen" as used herein does not refer to the hardware (that is, the display) that presents the graphics, text, controls, and such like. Typically, when a transaction is being entered at an SST, a series of screens are presented in succession on the SST display, the next screen displayed being dependent on a customer entry or activity relating to the current screen. For example, a first screen may request a customer to insert a card; once a card has been inserted a second screen may invite the customer to enter his/her PIN; once the final digit of the PIN has been entered, a third screen may invite the customer to select a transaction; and so on.

The operation transaction object 88 provides processing logic and presentation information (displayed on the rear operator panel 18i) to allow maintenance personnel (such as technicians or replenishers) from a service provider to execute replenishment or diagnostic operations at the ATM 10. The operation transaction object 88 controls the presentation of information to an ATM service engineer to guide the engineer through a replenishment or diagnostic operation.

The session object 90 provides persistence throughout a consecutive sequence of interactions. For an ATM transaction, a session may cover the duration of a transaction from a customer entering a card into the ATM card reader slot 22a to the customer concluding a transaction at that ATM 10; for example, by retrieving the card or dispensed cash. A session may also cover the duration of a replenishment or diagnostic operation performed by a maintenance person, the duration of a request from the ATM 10 to a third party information provider (such as a CRM database or advertisement provider), or such like.

In the management part 84, the transaction management object 92 records information relating to the status and operation of the customer transaction object 86 and the operation transaction object 88. For example, the transaction management object 92 records when the customer transaction object 86 is active, and the current state (and/or screen) of the customer transaction object 86. Similarly, the transaction management object 92 records when the operation transaction object 88 is active (that is, when a maintenance person (or other authorized person) is replenishing, maintaining, or diagnosing the ATM 10), and the current state (and/or screen) of the operation transaction object 88. The transaction management object 92 also records any regular data sent by the transaction objects 86,88 to indicate that these objects 86,88 are operating normally (sometimes referred to as a heartbeat). The transaction management object 92 also records significant events of the customer or operation transaction objects 86,88. These significant events include when the customer transaction object 86 is out of service.

In the management part 84, the device management object 94 collates status and fault information from the devices 18 via the run-time platform 70 and operating system 60, and makes this information available to the system application object 95.

The system application object 95 provides an operator (not an ATM customer, but a maintenance person such as a service engineer or other authorized person) with access to functions required to configure, diagnose, and maintain the ATM 10. The following seven system application functions (in addition to some others) are available from the system application 95 via the operation transaction processing object 88:

(i) maintenance,
  (ii) device self-tests,
  (iii) event logs,
  (iv) service tallies,
  (v) device status lists,
  (vi) device servicing, and
  (vii) device configuration.

These seven functions are implemented by accessing the device management object 94, and are explained in more detail below.

Some self-service devices are able to clean themselves when instructed to do so, for example, a card reader and a receipt printer. These operations are referred to herein as "maintenance" operations and can be performed by a maintenance person implementing the maintenance function from the system application 95.

Typically, each self-service device is able to perform one or more tests on itself to ascertain if it is operating correctly. This is referred to herein as a "device self-test", and can be initiated via the system application 95. Maintenance and device self-test operations are ways of exercising a device.

Windows NT (trade mark) records entries relating to: software operations (for example a time-out or a failure in accessing an object); device operations; and communication operations (for example, failure to receive an expected response to a message). These entries are referred to herein as "event logs" and the system application 95 allows the operator or engineer to view these event logs, search and filter these event logs, and copy these event logs to a diskette or print them out.

A "service tally" provides a list of the times at which a "service" has been requested for a particular device 18 since the tally was last reset. Typically, only service engineers can reset a tally. In this context, a "service" relates to software used to access functionality provided by a self-service device 18; for example, "dispense cash" is a service associated with the cash dispenser device 18f. This allows the customer transaction processing object 86 to be able to issue a "dispense cash" request to the platform 70, together with the amount to be dispensed, and the platform 70 provides the low level commands required to instruct the cash dispenser to dispense the amount of cash requested.

Care should be taken to distinguish between two different uses of the word "service" herein. The first use relates to software or an interface providing functionality to the control application 80 or some other application. The second use relates to repair, replacement, replenishment, cleaning or similar physical operations performed by a service engineer. It should be clear from the context which particular meaning is intended.

The "device status list" displays a list of all the devices 18 having states that require attention. For example, a cash dispenser device 18f may have a currency cassette that requires replenishment. The following information is provided for each device state requiring attention: device name—this is the name of the device that requires attention; description—this is a short description of the problem; attention—this shows whether the state requires attention 'now' or will require attention 'soon'; user category—this specifies what type of user is able to deal with the state (for example, a service engineer, or a staff member who clears media jams). Typically, a service engineer will be authorized to perform more operations than a staff member. A staff member may only be allowed to clear jams in a printer, replenish a printer with printable media, and such like.

The "device status list" includes replenishment states (where a consumable item, such as currency or a paper roll for a printer, needs replaced), and fault states (where a fault exists, such as a paper jam in a printer that needs to be cleared).

The "device servicing" function enables a service engineer to service (in the sense of repair, replace, replenish, clean, or such like) a device 18 even if that device does not report that it requires servicing. Once the service engineer has performed the service, the "device servicing" function automatically tests the serviced device to ensure that it is operating correctly. One example of a device servicing action may be emptying a purge bin.

The self-service "device configuration" function allows a staff member or engineer to display and set hardware and software parameters, such as the language used, alarms, and such like. A service engineer can also use the self-service "device configuration" function to set a printer active to allow the "device status list", "event logs", "service tallies" or such like to be printed by the ATM 10.

These seven system application functions operate by sending requests and receiving responses between the operation transaction processing object 88 and the system application 95.

The management part 84 includes fault handling capabilities to cope with any faults or exceptions, thereby ensuring that the ATM 10 does not suddenly go out of service, for example, during a transaction. In particular, the fault handler capability of the management part 84 deals with critical errors such as processor exceptions and memory protection violations, operating system exceptions, device exceptions, kernel level exceptions, catastrophic software problems, persistent failures, and power failures.

Operation of the ATM

During normal operation (referred to herein as transaction mode), the customer transaction object 86 controls the presentation of screens to an ATM customer to guide a customer through a transaction, such as cash dispensing, a balance enquiry, or the like. During and between transactions, the management part 84 records status and operational information about the devices 18 within the ATM 10.

When a maintenance person (for example, an engineer or a replenisher) arrives at the ATM 10 to perform some operations (maintenance and/or replenishment), then that person opens the ATM 10 from the rear (it is a rear access ATM 10 in this embodiment) and presses a supervisor control switch (not shown individually) on the rear operator panel 18i. This is detected by the control application (CA) 80, which changes the ATM 10 from transaction mode to maintenance mode. In maintenance mode the ATM 10 goes temporarily out of service so that a customer cannot attempt to conduct a transaction while a maintenance person is operating on the ATM 10.

The maintenance person can then use the rear operator panel 18i to access functions and data provided by the system application object 95 to configure, diagnose, and maintain the ATM 10. The operation transaction object 88 provides processing logic and presentation information (displayed on the rear operator panel 18i) to allow the maintenance person to execute replenishment or diagnostic operations at the ATM 10. The operation transaction object 88 controls the presentation of information on the rear operator panel 18i to guide the ATM maintenance person through a replenishment or diagnostic operation.

Once the maintenance person has completed the maintenance or replenishment operation, he/she selects the "device servicing" function to automatically test the serviced device to ensure that it is operating correctly. If the serviced device (or devices) is working satisfactorily, the maintenance person selects a maintenance complete option on the rear operator panel 18i. This is detected by the control application 80, which responds by initiating a compliance check of all devices 18 in the ATM 10.

If all of the devices 18 are working correctly, then the code issuing object 96 generates and issues a completion code. The control application (CA) 80 causes the journal printer to print out this completion code, and electronic records of this code are also kept.

If all of the devices 18 are not working correctly, then the rear operator panel 18i displays a message indicating which devices have faults needing corrected. Once these faults have been corrected, a completion code will be issued by the code issuing object 96.

In this embodiment, the code issuing object 96 uses a conventional random number generating routine for generating a random completion code. The completion code is displayed to the maintenance person on the rear operator panel 18i, and the maintenance person can write down this completion code in their log. The control application 80 also transmits the issued code using network connection 18h to a remote management system, as will be described in more detail with reference to FIG. 4.

Figure 4:
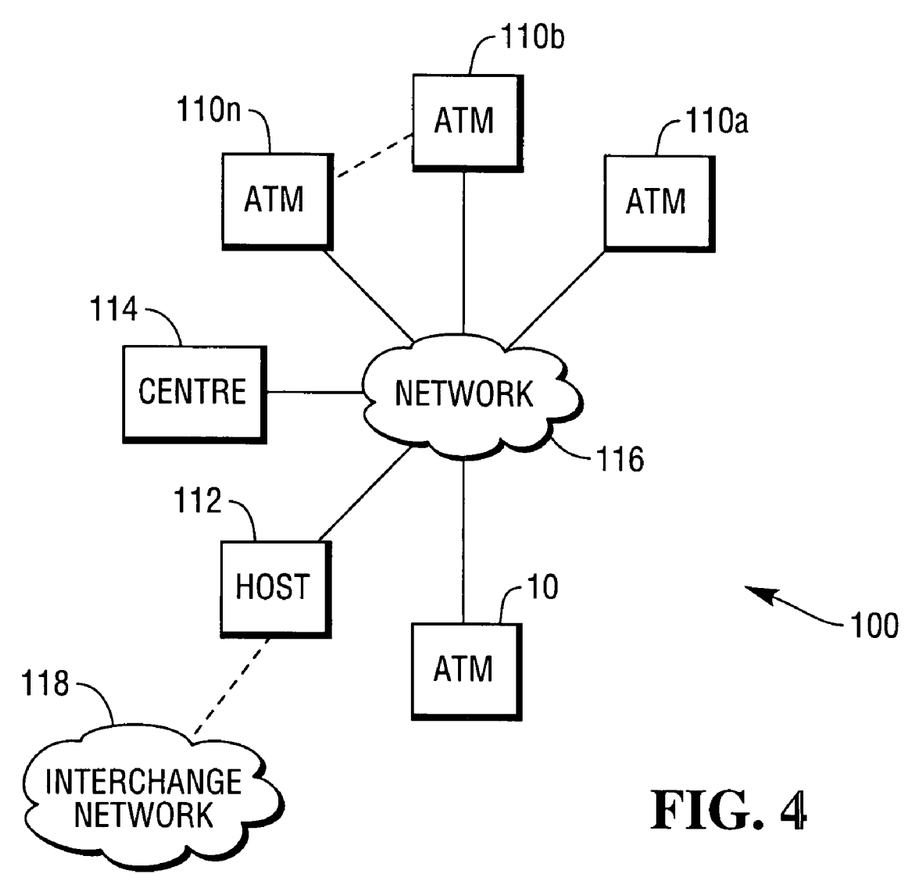
FIG. 4 is a block diagram illustrating a system including the ATM of FIGS. 1 and 2.

FIG. 4 is a block diagram illustrating an ATM network 100 comprising: ATM 10, other ATMs 110a,b,c, ... n, identical to ATM 10, an authorization host 112, and a management system 114, all coupled by an IP network 116, in the form of a private intranet.

The authorization host 112 can authorize "on us" transactions (that is, where the ATM network owner is also the issuer of the card used by the customer), and can route "not on us" transactions to other authorization hosts via interchange networks 118.

The management system 114 receives status messages and error messages from the ATMs 10,110 in the network 100. The management system 114 uses these messages to ascertain if a maintenance person should be deployed to maintain an ATM 10,110 in optimal operation.

For example, the management system 114 may receive a status message indicating that ATM 10 is low on banknotes. The management system 114 may then dispatch a replenisher to replenish that ATM 10.

As another example, the management system 114 may receive an error message indicating that there is a jam in the receipt printer 18b. The management system 114 may then either dispatch a first line maintenance person to clear the jam or in the event that the ATM 10 is located within a branch, then the management system 114 may notify a designated staff member (for example, via email) that a paper jam needs cleared. A first line maintenance person can generally perform operations that do not require any tools, such as clearing misfeeds, replacing rolls of paper in printers, and such like. Typically, status information from the receipt printer 18b and the journal printer 18g includes details of the amount of media (paper) remaining within each printer, details of how many print operations have been performed, and such like.

As a third example, the management system 114 may receive an error message indicating that there is a failure in a critical component, such as the cash dispenser device 18f. The management system 114 may then dispatch a second line maintenance person to fix the cash dispenser device 18f. A second line maintenance person can generally perform any required maintenance operations (with the exception of cash replenishment).

Once a dispatched maintenance person has completed a maintenance operation on the ATM 10, that maintenance person records the completion code provided by the ATM 10 and transmits the completion code to the management system 114. This transmission may be performed manually by the maintenance person physically handing over the code, or the maintenance person may email the code to an automated email address, or the maintenance person may speak the code to an automated voice mailbox system associated with the management system 114. Regardless of how the maintenance person transmits the completion code, the management system 114 compares the completion code provided by the maintenance person with the completion code received from the ATM's network connection device 18h. In the event of a match between the two codes, the maintenance person is credited with a compliant maintenance operation. In the event that the two codes do not match, the maintenance person is not credited with a compliant maintenance operation.

The management system 114 may require transmission of a completion code from an ATM 10,110 prior to allowing the ATM 10,110 to go back into service.

If the maintenance person cannot correct the outstanding faults, then these may be escalated to the next level by the maintenance person contacting the management system 114. Once the management system 114 dispatches another maintenance person to correct the outstanding faults, then the management system 114 may transmit an acknowledgement code to the original maintenance person either directly or via the ATM 10.

It will now be appreciated that the above embodiments have the advantage that they ensure that the replenisher cannot leave the SST without clearing faults or escalating the fault to the correct level.

Various modifications may be made to the above described embodiment within the scope of the invention, for example, in other embodiments a completion code may be used by the maintenance person to gain access to the next SST in the person's schedule. In such embodiments, when the maintenance person arrives at the next SST, the maintenance person enters the completion code issued by the last SST that was operated on. The SST then transmits this code to the management system 114, which compares this code with the code issued by the last SST that was operated on. In the event of a match, the management system 114 authorizes the SST to allow access to the maintenance person.

In other embodiments, the code issuing object 96 generates a completion code based on the devices 18 operated on by the engineer. In one such embodiment, data recorded by the management part 84 can be used as a seed from which the code is generated. In another such embodiment, the issued code may comprise a fixed code corresponding to the devices operated on (that is, a code that constant and independent of the person performing the operation and the time at which the operation is performed) appended to a time stamp.

In other embodiments, SSTs other than ATMs may be used, for example, check in terminals. In other embodiments using ATMS, lobby ATMs may be used in addition to or instead of through-the-wall ATMS.

What is claimed is:

1. A method of operating a self-service terminal, the method comprising:
   receiving notification that a maintenance operation has been performed on the terminal;
   performing a compliance check on the terminal;
   issuing a maintenance completion code by the self-service terminal in the event that the compliance check is successful; and
   providing an indication that the maintenance operation has been performed by the self-service terminal, including transmitting the maintenance completion code to a remote management system.

2. A method according to claim 1, wherein the step of receiving notification that a maintenance operation has been performed is implemented by detecting if the terminal receives a request to change from maintenance mode to transaction mode.

3. A method according to claim 1, wherein the method comprises the further step of providing status information to an operator prior to receiving notification that a maintenance operation has been performed.

4. A method according to claim 1, wherein the compliance check comprises communicating with devices in the self-service terminal to receive status information.

5. A method according to claim 1, wherein the step of issuing a maintenance completion code comprises generating the maintenance completion code.

6. A method according to claim 5, wherein the maintenance completion code is generated based on the particular operations performed by the operator.

7. A method according to claim 1, wherein the maintenance completion code is issued subsequent to receiving the maintenance completion code from another terminal or a remote management system.

8. A method according to claim 1, wherein the step of issuing a maintenance completion code includes presenting the maintenance completion code on a display in the self-service terminal.

9. A method according to claim 1, wherein the maintenance completion code is used as an access code to enable an operator to perform a maintenance operation at another self-service terminal.

10. A method of operating a self-service terminal, the method comprising:
    changing operation of the self-service terminal from transaction mode in which a terminal customer can perform a transaction to maintenance mode in which a self-service terminal operator can perform a maintenance function;
    providing status information to an operator by the self-service terminal;
    receiving notification from the self-service terminal that a maintenance operation has been completed;
    performing a compliance check prior to returning the self-service terminal to transaction mode;
    issuing a maintenance completion code by the self-service in the event of a successful compliance check; and
    providing an indication that the maintenance operation has been completed by the self-service terminal, including transmitting the maintenance completion code to a remote management system.

11. A self-service terminal comprising:
    a plurality of customer interaction devices; and
    a controller coupled to the customer interaction devices for controlling their operation, the controller being operable in a maintenance mode in which an operator can perform a maintenance function on the self-service terminal, and a transaction mode in which a customer can perform a transaction at the self-service terminal, the controller being programmed:
    (i) to communicate with the customer interaction devices and a remote management system;
    (ii) to detect a request to change from maintenance mode to transaction mode;
    (iii) to perform a compliance check prior to changing from maintenance mode to transaction mode;
    (iv) to issue a maintenance completion code from the self-service terminal in the event of a successful compliance check; and
    (v) to provide an indication that the maintenance operation has been performed, including transmitting the maintenance completion code to the remote management system.

12. A self-service terminal according to claim 11, wherein the self-service terminal is an automated teller machine ATM.

13. A method of operating a network of self-service terminals coupled to a management system, the method comprising:
    receiving from a self-service terminal a first completion code issued by that self-service terminal in response to a maintenance operation performed by a maintenance person,
    receiving from the maintenance person a second completion code purportedly issued by the self-service terminal; and
    accrediting the maintenance operation in the event of a match between the first and second completion codes.

14. A method of operating a self-service terminal, the method comprising:
    receiving notification that a maintenance operation has been performed on the terminal;
    performing a compliance check on the terminal; and
    issuing a code in the event that the compliance check is successful by the self-service terminal;
    wherein the issued code is used as an access code to enable an operator to perform a maintenance operation at another self-service terminal.

* * * * *